United States Patent
Gourdol et al.

(10) Patent No.: US 7,603,357 B1
(45) Date of Patent: Oct. 13, 2009

(54) COLLABORATIVE ASSET MANAGEMENT

(75) Inventors: Arno Gourdol, San Francisco, CA (US);
Daniel C. Brotsky, Berkeley, CA (US);
Robert Schaffel, Fremont, CA (US);
Michael Jamrosy, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 1181 days.

(21) Appl. No.: 10/858,857

(22) Filed: Jun. 1, 2004

(51) Int. Cl.
*G06F 17/30* (2006.01)

(52) U.S. Cl. .................. 707/10; 718/100; 718/104; 718/107; 707/1; 707/8

(58) Field of Classification Search ............ 707/3, 707/10, 104.1, 1, 8; 718/100, 104, 107; 709/205, 709/201, 202, 224
See application file for complete search history.

(56) References Cited

U.S. PATENT DOCUMENTS

| | | | |
|---|---|---|---|
| 5,245,553 A | 9/1993 | Tanenbaum | |
| 5,339,389 A | 8/1994 | Bates et al. | |
| 5,515,491 A | 5/1996 | Bates et al. | |
| 6,175,853 B1 * | 1/2001 | Stracke, Jr. | 718/107 |
| 6,240,414 B1 * | 5/2001 | Beizer et al. | 707/8 |
| 6,341,291 B1 * | 1/2002 | Bentley et al. | 707/203 |
| 6,632,251 B1 | 10/2003 | Rutten et al. | |
| 6,678,698 B2 * | 1/2004 | Fredell et al. | 707/104.1 |
| 6,701,345 B1 | 3/2004 | Carley et al. | |
| 6,772,154 B1 * | 8/2004 | Daynes et al. | 707/8 |
| 6,918,082 B1 | 7/2005 | Gross et al. | |
| 6,938,070 B2 * | 8/2005 | Esposito | 709/205 |
| 7,047,168 B2 * | 5/2006 | Carballo et al. | 703/2 |
| 7,194,489 B2 * | 3/2007 | Bentley et al. | 707/203 |
| 7,408,920 B2 * | 8/2008 | Berkley et al. | 370/352 |
| 7,454,760 B2 * | 11/2008 | Mohan et al. | 719/318 |

* cited by examiner

*Primary Examiner*—Jean M Corrielus
(74) *Attorney, Agent, or Firm*—Fish & Richardson P.C.

(57) ABSTRACT

Methods and apparatus, including computer systems and program products, for enabling collaborative asset management. In one implementation, a computer program product includes instructions to perform the operations of providing a first copy of an asset for use by a first user. The asset is available for use and editing by multiple users, and the asset and the first copy each has a corresponding state. The instructions include monitoring changes in the states of the asset, the first copy, and/one or more additional copies of the asset. The additional copies of the asset correspond to one or more concurrent users. If a conflict is detected between the state of the first copy and the state of the asset, or between the state of the first copy and the states of the additional copies, the instructions include providing guidance to the first user about how to resolve the conflict.

18 Claims, 6 Drawing Sheets

| Conflict | Alert | Guidance (Options Presented to User) |
|---|---|---|
| user has opened a local copy of the asset, and another user starts editing the asset | "in use" alert 545 | 1) close the asset<br>2) continue using the local copy of asset |
| user has opened a local copy of the asset, and a newer version of the asset is saved to the repository before the user has begun to edit the local copy of the asset | "out of date" alert 550 | 1) download the new version of the asset so as not to edit an out-of-date version<br>2) continue using the local copy of asset |
| user has begun to edit the local copy of the asset, and a newer version of the asset is saved to the repository | "server update" alert 555 | 1) download the new version of the asset and discard changes made by user<br>2) continue editing the local copy of the asset and resolve differences later |
| user begins editing the local copy of the asset while another user is already editing the asset | "edit" alert 560 | 1) discard changes made by user<br>2) continue editing the local copy of the asset and resolve differences later |
| user wants to save changes he made to the asset to the repository while another user is editing the asset | "conflict" alert 565 | 1) cancel the save to the repository<br>2) save the changes to the repository and ask the other user to discard his changes |

FIG. 5

COLLABORATIVE ASSET MANAGEMENT

BACKGROUND

The present application relates to asset management in a collaborative environment.

Enterprise systems tend to have assets which are shared among multiple users. In this context, an asset can refer to an individually identifiable and accessible holder of content, such as a document, a file, a photograph, an illustration, a layout, a graph, a font file, a library file, a template file, or a graphic figure that is involved in the production of a project. The users can be involved in one or more projects, and the assets can be shared among different projects as well.

An asset can be stored in a repository (e.g., a server that stores shared assets), and a user may typically check out an asset from the repository to modify the asset. The repository can also provide a common namespace for assets that are shared among multiple users. The check-out procedure involves one or more explicit steps that the user must perform in order to modify the asset. Such explicit steps typically involve ensuring that the asset can be modified by only one user at a time, and permitting only one asset check out at a time. When the user has completed their modifications to the asset, the asset can be sent and stored in the repository again by checking in the asset with one or more explicit steps.

SUMMARY

The present invention provides methods, techniques, and apparatus, including computer program products, which implement techniques for managing assets in a collaborative environment.

In one general aspect, the techniques feature a computer program product, stored on a machine-readable medium, the computer program product includes instructions to perform operations. The instructions include providing a first copy of an original asset for use by a first user. The original asset is available for use and editing by multiple users, and the original asset and the first copy each has a corresponding state. The instructions include monitoring changes in the state of the original asset, in the state of the first copy, and in one or more additional states corresponding to one or more additional copies of the original asset. The additional copies of the original asset correspond to one or more concurrent users from the multiple users, and the changes are caused by actions of the first user and the concurrent users. If a conflict is detected between the state of the first copy and the state of the original asset, or between the state of the first copy and the states of the additional copies, the instructions include providing guidance to the first user about how to resolve the conflict.

Advantageous implementations can include one or more of the following features. For example, the first copy of the original asset can be stored in and obtained from a repository. The repository can be a remote repository and/or can include multiple distinct storage locations. The multiple distinct storage locations can be arranged in a peer-to-peer configuration. The instructions for the monitoring of the changes can include communicating with a registry. The registry can store a status of one or more copies of the original asset, and each copy of the original asset can correspond to a distinct storage location.

The detection the of the conflict can include determining whether the original asset stored in the repository is newer than the first copy of the original asset, and the instructions providing guidance can include providing the first user with an option to replace the first copy of the original asset with the original asset in the repository. The instructions for guidance can be provided in a graphical user interface.

In another implementation, the detection of the conflict can include determining whether one of the concurrent users is editing one or more additional copies of the original asset, and the instructions providing guidance can include providing the first user with an option to close the first copy of the original asset. The instructions can include detecting when the first user has made one or more changes to the first copy of the original asset, and upon detecting that the first user has made one or more changes to the first copy of the original asset, automatically attempting to lock the original asset on behalf of the first user. The detection the conflict can also include determining whether the original asset is already locked on behalf of one of the multiple users. The instructions providing guidance can also include providing the first user with an option to disregard the changes made to the first copy of the original asset.

Other instructions can include receiving one or more changes made to the first copy of the original asset by the first user, and receiving user input from the first user. The user input can indicate that the first copy of the original asset should be saved to a repository. The instructions can include determining if the original asset is locked on behalf of the first user, and if the original asset is locked on behalf of the first user, saving the first copy of the original asset in the repository and automatically unlocking the original asset.

In another implementation, metadata can be associated with the original asset. The metadata can have a state, and a conflict in the state of the metadata can be detected when detecting the conflict of the original asset.

The detection of the conflict can include determining whether the original asset is already locked on behalf of one of the multiple users. The instructions providing guidance can include notifying the first user that one of the multiple users had made conflicting changes to the original asset, as well as providing the first user with an option to save the first copy of the original asset in the repository. If the original asset is locked on behalf of one of the multiple users and the first user indicates to save the first copy of the original asset in the repository, the instructions can include attempting to unlock the original asset, and if the attempt to unlock the original asset is successful, saving the first copy of the original asset in the repository.

In another implementation, the instructions can include receiving one or more changes made to the first copy of the original asset by the first user, receiving user input from the first user, and determining if the changes have been saved to the first copy of the original asset. The user input can include a selection to close the original asset. If the changes have not been saved to the first copy of the original asset, instructions can include providing the first user with an option to save the changes to the first copy of the original asset or to the original asset. If the changes have been saved to the first copy of the original asset, instructions can include providing the first user with an option to save the changes to the original asset stored in the repository.

In another implementation, when the conflict cannot be detected, instructions can include warning the first user that the computer program product cannot provide assurance of detecting conflicting states for the original asset. When the conflict can once again be detected after not being able to be detected, instructions can include determining whether there are changes to the first copy of the original asset, and upon determining there are changes to the first copy of the original asset, providing the first user with an option to discard the changes to the first copy of the original asset. For example, the user may select the option to discard their changes to their copy of the asset if they return online after going offline with their copy of the asset, and editing their copy of the asset offline.

In another general aspect, the techniques feature a computer program product, stored on a machine-readable medium. The computer program product includes instructions operable to cause data processing apparatus to download a copy of an asset for a first user from a repository, detect when the first user begins to modify the copy of the asset, and automatically check out the asset on behalf of the first user upon detecting that the first user begins to modify the asset.

Advantageous implementations can include one or more of the following features. For example, if the first user begins to modify the asset and another user has another copy of the asset open, alert the other user that the first user is modifying the asset. The computer program product can cause the data processing apparatus to automatically check in the copy of the asset when the first user selects to save a version of the asset. The check-in can include one or more instructions to upload the copy of the asset to the repository. The automatic check-in can include instructions to determine whether there is a conflict between the copy of the asset and another copy of the asset corresponding to another user, and upon determining that there is no conflict, prompt the user to save the version of the copy of the asset.

In another general aspect, the computer program product includes instructions to perform operations that includes enabling use of a first asset by a first user. The first asset is associated with a second asset, and the second asset has a state and is capable of being updated by multiple users. The first asset has an appearance that depends on the state of the second asset. Instructions include monitoring use of the second asset to detect when the second asset has been updated by one or more of the multiple users, and upon detecting that the second asset has been updated, notifying the first user that the second asset has been updated.

Advantageous implementations can include one or more of the following features. For example, the state of the second asset can include an appearance of the second asset. The instructions can include displaying a graphical representation of the second asset. In notifying the first user that the second asset has been updated, instructions can include modifying the graphical representation of the second asset and/or notifying the first user of which of the multiple users who updated the second asset. Instructions for monitoring use of the second asset can also include detecting when the second asset is being edited by one or more of the multiple users. Upon detecting that the second asset is being edited, instructions can include notifying the first user that the second asset is being edited and/or notifying the first user of the one or more of the multiple users who are editing the second asset.

In another general aspect, the computer program product includes instructions to perform operations that includes receiving input from a first user selecting an asset for use, and presenting a copy of the asset to the first user for use. The asset has a state and is capable of being used and edited by multiple users. Instructions include presenting information to the first user that the state of the asset has changed, based on use of the asset by one or more of the multiple users, in a way affecting the use by the first user, and presenting guidance to the first user. The guidance includes options for how to handle the changed state of the asset.

Advantageous implementations can include one or more of the following features. For example, the instructions presenting guidance can include one or more of: discontinuing the use of the copy of the asset; continuing the use of the copy of the asset; downloading a new copy of the asset; discarding changes made to the copy of the asset by the first user; resolving a conflict in the state of the asset at a later time; canceling an attempt to save the copy of the asset to a repository; and saving the changes made to the copy of the asset by the first user to the repository and requesting a second user to discard changes made by the second user to another copy of the asset. The presentation of the guidance can include displaying the options in one or more dialog boxes and displaying explanations of consequences associated with the options.

The techniques described in this specification can be implemented to realize one or more of the following advantages. Automatic check-outs and check-ins of assets can occur transparently to the user of an asset. The automatic check-outs and check-ins of assets do not require explicit action from the user, such as requiring the user to block or lockout other users from accessing the asset when checking out an asset from the repository. The check-in and check-out processes can be automated to download a local copy of the asset from the repository and allow the user to edit the local copy of the asset. The automation of the process of check-outs and check-ins can reduce a number of workflow steps for the user. The user can download and edit the asset even if other users have a local copy of the asset and are editing their local copy of the asset at the same time. Multiple users can concurrently edit a local copy of the asset, and each user will be informed if the actions they take and the actions taken by the other users with respect to the asset are likely to result in conflicting states of the asset. The described program encourages collaborative users of an asset to resolve conflicts instead of forcing the users to adhere to a rigid conflict avoidance protocol.

Details of one or more implementations of the invention are set forth in the accompanying drawings and in the description below. Other features and advantages of the invention will become apparent from the description, the drawings, and the claims.

BRIEF DESCRIPTION OF THE DRAWINGS

FIG. 5 shows an exemplary table of some of the provided guidance.

Like reference numbers and designations in the various drawings indicate like elements.

DETAILED DESCRIPTION

Figure 1:
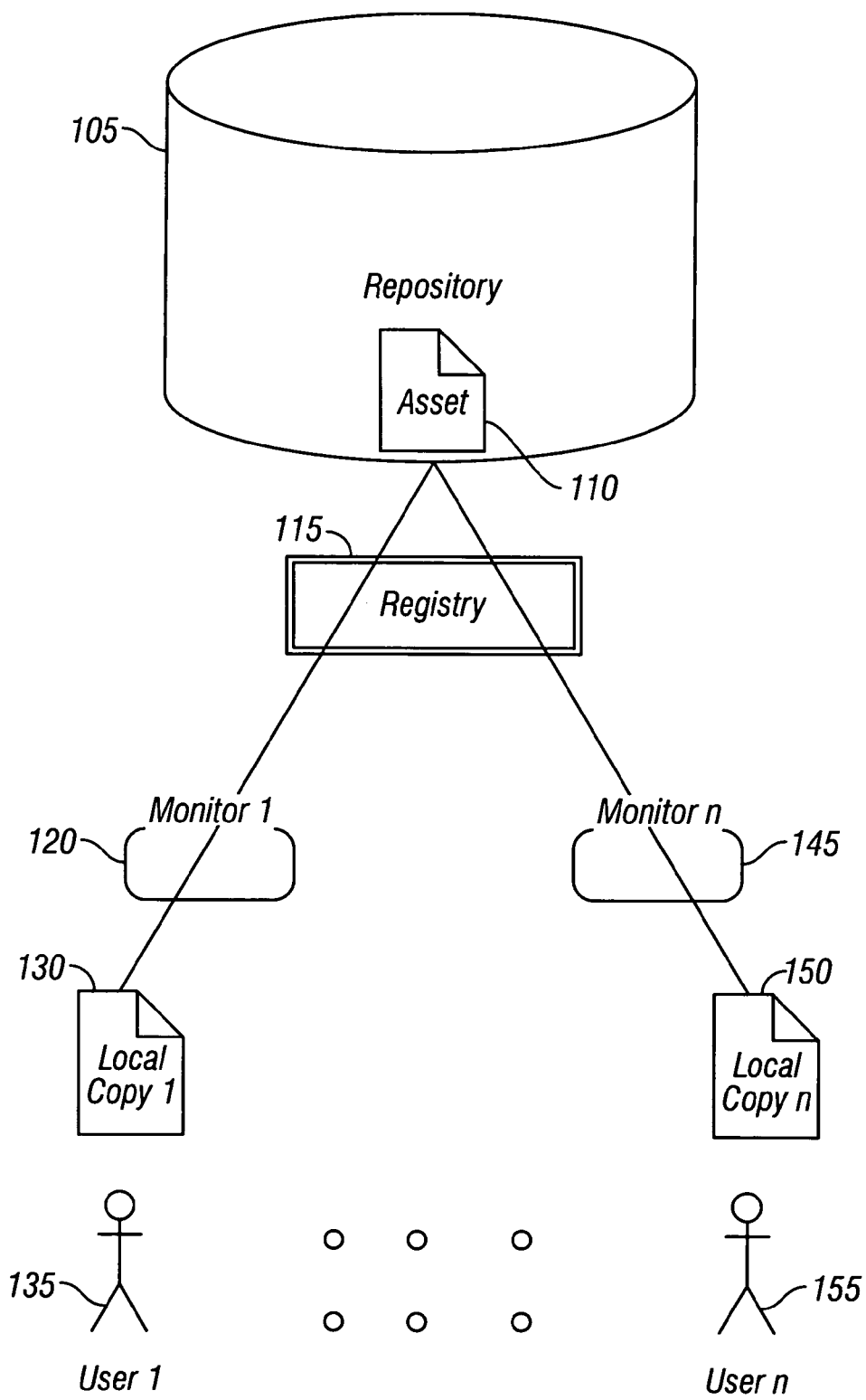
FIG. 1 illustrates an exemplary block diagram of an asset that is shared by multiple users.

Traditionally, a check-out or check-in model for an asset involves one or more explicit actions by a user to download the asset from the repository. In the check-out process, the asset itself can be downloaded on the user's client machine, or a local copy or version of the asset can be downloaded on the client's machine. The user can modify the asset when it is checked out. When the user is finished modifying the asset, the asset or its local copy can be uploaded onto the repository.

The check-in process includes the process of uploading and saving the asset back to the repository.

Conventional asset management systems, sometimes referred to as Digital Asset Management systems, can require users who need to make chances to an asset to first check out the asset. In checking out the asset, the user can be required to obtain permission to make changes to the asset, and the system can ensure that the asset is not currently being modified by another user. It is after a successful check in of the asset, other users can be permitted to modify the asset. In the conventional check-out/check-in model, the user may be required to remember the status of the asset as to whether it is checked out or checked in. The user also may have to be aware of whether they are working on the current copy of the asset from the repository and/or if some other user is editing the asset. The user may be required to have knowledge of whether the asset in the repository has been updated by another user before the user uploads and saves their local copy of the asset back to the repository. For example, the user can check out a copy of the asset from the repository, obtain permission to work on the asset, and after making edits to the asset, a second user may edit and upload another copy of the asset before the user saves the edited asset. The second user can obtain permission to work on the asset if the first user checks out the asset and goes offline for a period of time. In going offline, the first user can disconnect from the repository. The users may be required to keep track of information for the status of the asset, such as information on which user has priority to work on the asset, and which local copy of the asset should be properly checked back into the repository.

In another aspect of the conventional check-out/check-in model, the user can also be required to add one or more steps to their workflow. For example, the user can be required to acknowledge that they are no longer working on the asset and other users can be permitted to have access to the asset after the user checks in the asset. The conventional systems can restrict others from working on the asset, so that only one user can modify the asset at a given time.

Conventional systems can also use a "merge" model in handling conflicts. The merge model can involve a set of additional steps to be used to resolve conflicts. For example, if a copy of an asset is based on an older copy instead of a current copy, the conventional system can require the user to take the changes or differences from both copies of the asset (old and current copy) and "merge" those changes into a new asset. The merge model can require the user to add one or more steps to their workflow.

An asset can be shared among several users in a project. The users can have specialized roles in the project and can modify the asset according to their role. For instance, an editing specialist can select and crop a photograph in the asset, and a producer can color and enhance the photograph image. A page layout specialist can place the image in a page layout, an archivist can tag and catalog the image for later retrieval, and a rights specialist can approve the image for public distribution. A conventional method of dealing with conflicts is to conduct monitoring of the workflow so that the system determines which user is permitted to work on the asset.

Another conventional method of dealing with conflicts is to have the system to avoid conflicts all together, so that only one person is working on the asset at a given time. The conventional asset management systems can require explicit actions from a user to block other users from accessing the asset while the user is working on it. Sometimes the blocking of others from using the asset is included as part of the check-out process—so when the user checks out an asset, the user is required to explicitly block other users from working on the asset at the same time. Alternatively, users of the asset can physically pass around a reference hard copy of the asset to ensure that only one person at a time is allowed to edit the asset. Other conventional systems can support ad hoc collaboration and can use conflict avoidance and resolution techniques without including check-out or check-in procedures.

The following describes various tasks, techniques, and systems relating to collaborative asset management. The disclosed methods of conflict avoidance and/or conflict management can reduce the chances for errors, enhance efficiency, and can be adapted to distributed project teams. The present disclosure describes methods and techniques to provide a software solution to prevent conflicts from occurring when users use assets collaboratively, and to provide guidance when conflicts do occur. The guidance can be presented to one or more users with one or more graphical representations and/or dialog boxes, and the guidance can include alerts and warnings. Techniques and software products are described that can provide continuous monitoring of an asset for the users that are currently working on the asset, and determine whether modifications on the asset are in conflict. If conflicts do occur or are about to occur, the software product provides guidance to the user to advise the user of how to handle conflicts and/or the software product provides warnings and alerts to other current users of the asset regarding the conflict. The disclosure also describes techniques and software products for automatic check-outs and check-ins of assets in which the check-outs and check-ins occur transparently to the user. The automatic check-outs and check-ins of assets do not require explicit action from the user, such as requiring the user to block or lockout other users from accessing the asset when checking out an asset from the repository. The user can download and edit the asset even if other users have a local copy of the asset and are editing their local copy of the asset at the same time. A local copy of an asset can refer to a copy of the asset that is in a storage location other than the storage location of the repository. Multiple users can be concurrently editing a copy of the asset, and each user will be informed of what other users are currently working on the asset, and if any of those users have checked in their changes for the asset in the repository.

The repository can include one or more storage locations (e.g., it can include a remote storage location, a single, central storage location or physically distributed storage locations). When a repository includes multiple storage locations, the multiple storage locations can be arranged in different types of configurations, such as hierarchical configurations or peer-to-peer configurations.

FIG. 1 illustrates an exemplary block diagram of an asset 110 that is shared for multiple users 135, 155. A program can be used to manage the status of the asset 110, so that all current users 130, 155 of the asset can automatically be informed of the status of the asset among the various current users of the asset. Based on the status of the asset, the current users can make workflow decisions.

In one implementation, an asset 110 is stored in a repository 105, a server that can store multiple shared assets. Data associated with the status of the asset 110 is stored in the registry 115. In some implementations, the registry can be part of the repository. One or more users 135, 155 of the asset 110 can have a local copy 130, 150 of the asset on their client machine as a result of selecting the asset 110 from the repository 105. When the user first selects the asset in the repository, the local copy of the asset is automatically downloaded for the user. In checking out the asset 110, the local copy 130 can be automatically downloaded onto a user's client machine when the user 135 selects and attempts to modify the local copy of the asset 110. In one implementation, the asset can be considered to be checked out when the user attempts to modify the local copy of the asset 110, and a status of the asset is updated. The status of the asset can be automatically updated in the registry 115 to designate the user 135 who checked out the asset 110 as the current user. The storage location of the copy of the asset is monitored, and the user 135 is registered in the registry 115 when checking out an asset 110. The status of the asset 110 and each local copy 130, 150 of the asset is monitored to detect direct or indirect user actions that affect the status of the asset and that can potentially result in conflicting states of the asset. Direct user actions can refer to the actions that the user 135 can have on the local copy 130. Indirect user actions can refer to the actions that another user 155 can have on the local copy 130. For instance, the status of the asset 110 can be affected depending on the user 135 edits, attempts to edit, or saves of the local copy 130 of the asset, or when another user 155 has edited or saved their local copy 150 of the asset.

The program can provide both monitoring and guidance for each current local copy 135, 155 for conflict detection and resolution. A "current" local copy can refer to a local copy in which the user is currently online (e.g., connected to the repository) and is working on or attempting to work on a local copy of the asset. When the user 135 decides to save their local copy 130 of the asset 110 to the repository 105, the program can perform a number of tasks automatically without requiring the user to perform additional explicit steps. For example, the asset 110 can be copied back into the repository 105, and the registry 115 can automatically update the status of the asset 110 for that user. After the user 135 checks in their local copy 130, the user 135 is unregistered in the registry 115 for that asset 110. The user 135 will no longer have the current local copy 130 of the asset, and any other current users 155 of the asset can be automatically notified that the user 135 has checked in their local copy of the asset 110.

The described program can be part of another program that is not limited to the functions described herein. For example, the described program can be part of an enterprise image processing program that can perform functions other than collaborative asset management.

The data associated with the asset used in operation with the collaborative asset management system can include the time and date the asset was created or modified, the size of the asset, and the identity of the user who created or last modified the asset. There can be other data associated with the asset used by the collaborative management system. The data associated with the asset is not limited to be used in operation of the described collaborative management system, but can also be used in operation with other asset management systems.

The registry data can include a fingerprint of the document. For example, a fingerprint or identifying characteristic of the document, such as an electronic tag, can allow the registry to determine if the asset is the asset in the repository 105 or a user's local copy 130 of the asset on a client machine. Any number of fingerprinting processes can be used. For example, the fingerprint can be based on the size and modification date of the asset. Alternatively, the fingerprint can be a hash of the content of key data items of the asset. The hash of the content can allow the fingerprints of copies of an asset to be compared when the asset has been created from and modified by different systems.

The repository can be a versioned repository or a non-versioned repository. A versioned repository can store the asset and a history of the modifications to the asset. The versioned repository can keep the current version of the asset, as well as previous versions of the asset that have been saved to the repository and/or previous versions of the asset for certain "snapshot" time periods. A non-versioned repository stores only the current version of the asset. Versioned repositories can allow retrieval of previous versions of the asset. The techniques described herein can be implemented in conjunction with versioned or non-versioned repositories.

In providing guidance, the program can issue a number of alerts and warnings if there are conflicts or potential conflicts in the state of an asset. For example, the program can warn a user 135 when the user 135 is viewing an asset 110 that another user 155 has begun to edit. When information cannot be obtained properly from the system repository in the event of a system or communication error, a warning can be issued to the user 135 to inform the user that the program cannot assure or guarantee that there are not other conflicting changes for the asset from other users. The warning of no assurance can also occur when a user comes online and connects to the repository after the user has been offline with a copy of the asset. The program can also issue a warning when a user attempts to check in their local copy of the asset, and another user has saved their local copy to the repository. Rather than forcing users to perform certain operations when conflicts occur as in conventional asset management systems, the described program can be better oriented toward providing advice and guidance to users about what the users can do if and when conflicts or potential conflicts occur. Various types of guidance and warnings are described in the figures below.

The monitoring can include active, event-driven monitoring, and/or passive monitoring. The monitoring can track and detect changes in the state of the asset in the registry, including the current local copies, as well as detect the users that come online to the system. The monitoring can include comparing fingerprints. Individual users are not required to make explicit actions to initiate monitoring. For each local copy 130 of the asset that is created, a replica monitor program 120 is created to keep track of the status of the local copy 130 and to monitor conflicts and/or potential conflicts with the asset and/or other local copies 150. The replica monitor program can perform background processing on the client machine, and can be operating asynchronously with a network server.

The program can also monitor the entire local copy of the asset or part of the local copy of the asset. In one implementation, the program can monitor metadata that is associated with the asset. The metadata associated with the asset can include data that is associated with the asset and that is used by the asset management system to monitor and manage the asset. The program can also monitor other assets or documents indirectly. For example, the program can monitor compound documents—which include the content and context of the document, and the content and/or context of other related documents. So the program can monitor modifications to a document, and also modifications that another user is indirectly making to the document. The indirect modifications made to the document do not necessarily have to be conflicting modifications. For example, the document can have content that refers to an image in a related document. If another user edits the image, the document will also reflect that modification. The program can issue warnings to the user of both documents.

Figure 2:
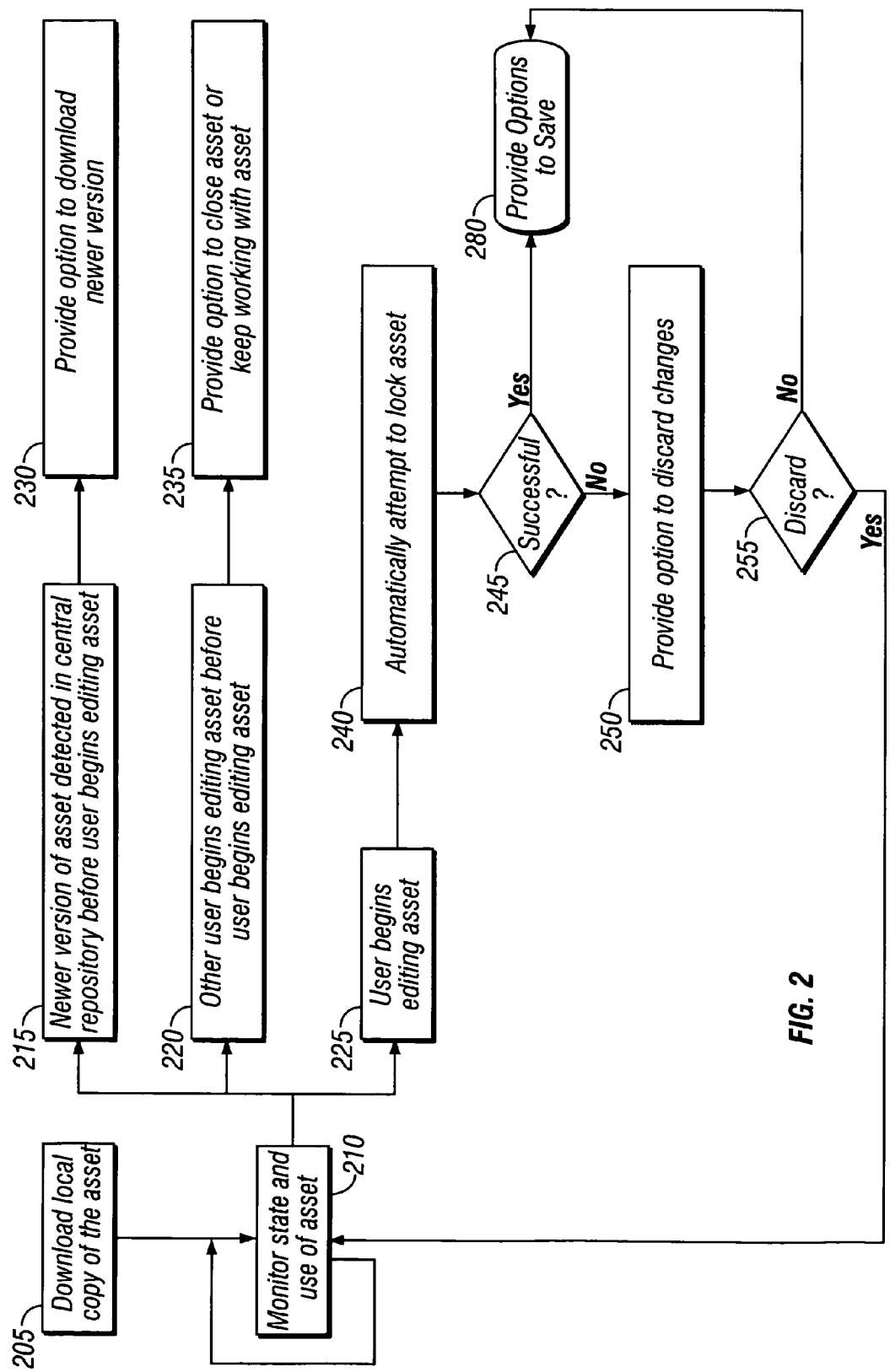
FIG. 2 is a flowchart illustrating a process of downloading and editing an asset.

FIG. 2 shows a flow diagram for the check-out and editing aspects described in regards to FIG. 1. The repository stores the asset and a monitoring system keeps track of all of the local copies of the asset that have been downloaded to a client machine.

When a user attempts to open an asset, the status of the asset is verified and updated. In some cases, an asset may not exist when the user attempts to open an asset because a user's view of an asset in the repository may be out of date, and the asset may no longer exist. If the asset exists, a local copy of the asset is downloaded (block 205) from the repository onto the client machine and a replica monitor for the asset is launched. The replica monitor is part of the overall monitoring system for the asset, and constitutes a monitoring program for each open local copy of the asset. The monitoring system will use the replica monitor when the local copy is open for editing to keep the user advised of the status of the asset (block 210). When the local copy of the asset is closed, the replica monitor will be released and monitoring is terminated for that local copy. The replica monitor can compare the fingerprint of the local copy of the asset with a fingerprint of the asset on the server. The replica monitor can also compare the local fingerprint of the current copy to the local fingerprint of the copy when the asset was copied from the repository. The replica monitor can compare fingerprints to determine whether the local copy of the asset was modified since it was downloaded from the repository, and also to determine whether the asset in the repository has been updated since it was downloaded. The monitoring system can compare the fingerprints among the local copies of the current users.

Based on the monitored information, one or more actions can occur, such as warning the user about different versions of the asset, automatically downloading a newer copy of the asset in the background, and/or opening the local copy of the asset. For example, if the monitor fails to verify the state of the asset, the local copy can be opened, but the user will be warned that the status of the asset cannot be verified. If the monitor does verify the state of the asset and the local copy of the asset is current, the local copy can be opened without the warning that the status of the asset cannot be verified. If the monitor verifies the state of the asset and the local copy is an older copy of the asset in the repository (block 215), the program can warn the user that the local copy is out of date and/or attempt to refresh the local copy with a current copy of the asset. In refreshing the local copy, the program can automatically download a newer copy of the asset in the background without requiring user intervention. Alternatively, the program can use a graphical user interface window to provide an option to the user to download the current version of the asset from the repository (block 230).

The program can monitor (block 210) all current copies of the asset that are on the respective client machines. If another user begins to edit the asset before the user begins to edit the asset (block 220), the program can provide an option to the user to close the asset or continue to edit the asset (block 235). If the user selects to continue to edit the asset, the user can edit and save the local copy of the asset on the local client machine. However, the user can be prompted to help resolve potential conflicts if the user later attempts to share the local copy with other users by checking in the local copy in the repository.

When a user begins to edit a local copy of the asset or its metadata (block 225), the replica monitor detects that the user is attempting to edit the local copy of the asset, and the program "locks" the asset to the user (block 240). In "locking" the asset to the user, the monitoring system registers with the registry that the user has begun an edit to the asset. In this aspect, the user can check out the asset and obtain a lock when they first attempt to edit the asset. A user can obtain the lock in the background—so the locking process can occur transparently to the user to not interfere with the editing of the document, and to not require the user to perform explicit actions to obtain the lock. The program can also notify all other current users of the asset that the current user now has the "lock". Even though other users can be given this notification, those users are still permitted to edit their local copy of the asset. Those other users can also be permitted to obtain or "steal" the lock from the current user if they have the authorization to do so in the repository. Alternatively, the user can steal the lock from another user that currently has the lock if the user has the authorization to steal the lock.

If the locking attempt is successful (block 245), the user can view, modify, and save the local copy (block 280). The user can be able to view, modify, and locally save the local copy of the asset on the client machine even if the lock is not successfully established for the user. For example, if another user begins to edit their local copy of the asset and steals the lock, the user loses the lock, but not the ability to view, modify, and locally save the user's local copy. Locks can be used when the user is opening or modifying a local copy of an existing asset and when a user first attempts to edit an asset. The program notifies all current users of the asset whenever there is a change in the status of a lock for an asset.

The user can be allowed to perform multiple save operations of the local copy on the client machine. If the user selects to not save the local copy on the client machine and/or if the attempt to lock the asset is unsuccessful, the program can provide the user with an option to discard the changes (block 255). If the user selects to discard the changes, the changes can be discarded and the monitor can continue to monitor the state and use of the asset (block 210) and the unaltered local copy. If the user selects to save the changes, the user can save the local copy in one of several different options (block 280).

Figure 3:
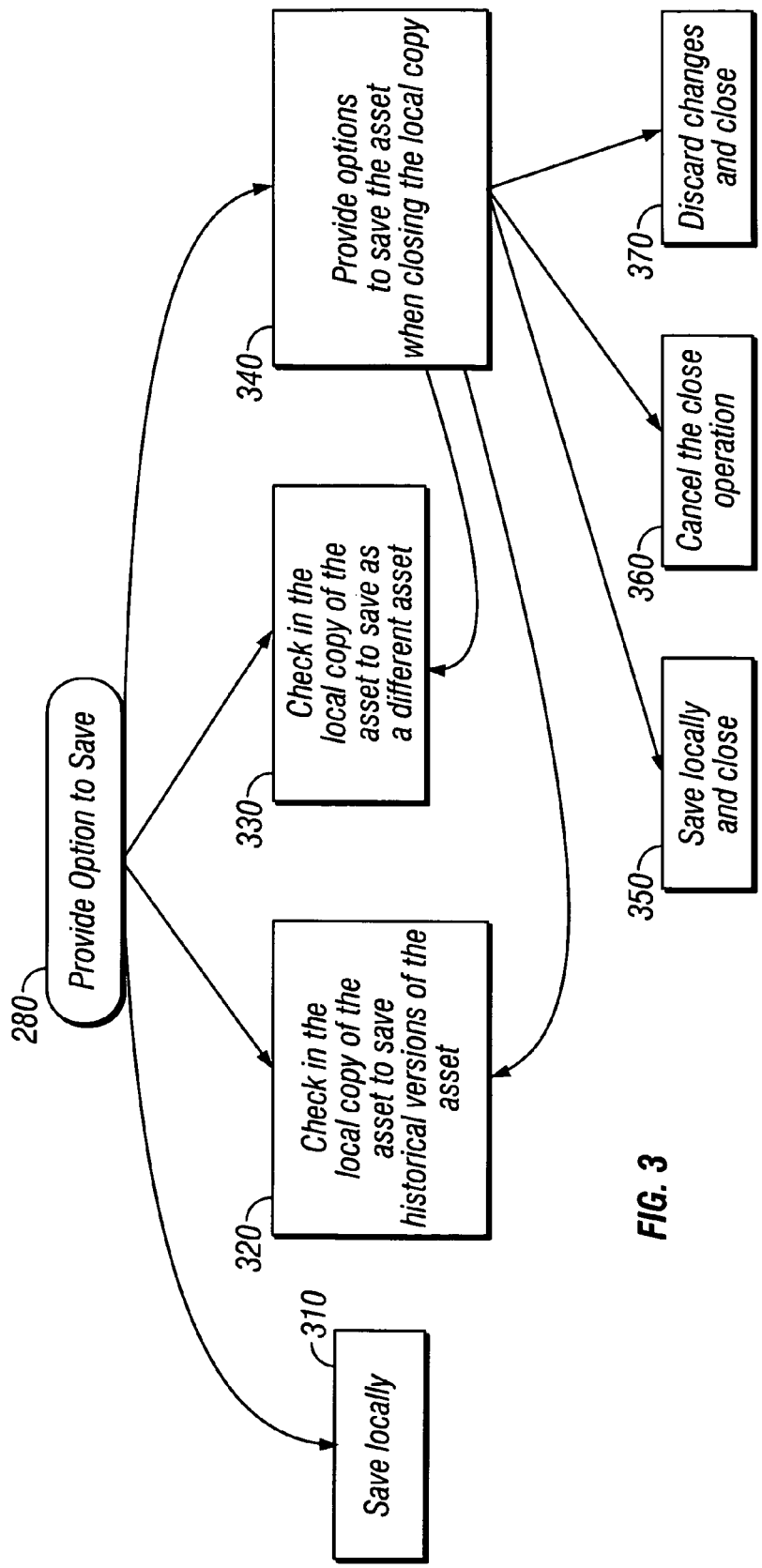
FIG. 3 shows a block diagram of various options for saving an asset.

FIG. 3 shows a block diagram of various options that the program can provide for the user to save the local copy of the asset. The user can save the local copy of the asset locally on the client machine (block 310). The local copy of the asset is monitored, and the user is provided with warnings of the actions of other asset users. These warnings are provided to the user even when the local copy is saved on the client machine. In another option to save, the user can check in the local copy of the asset to save historical versions of the asset (block 320). The user can also select the option to check in the local copy of the asset to the repository to save as a different asset (block 330). The options to save and check in the local copies to the repository in blocks 320 and 330 are described below in FIG. 4. Another option that the program can provide is the option to save the asset when closing the local copy (block 340).

When the user attempts to close a local copy of the asset without saving (block 340), the program can prompt the user to choose from multiple options. For example, the user can locally save the local copy on the client machine and then close the local copy (block 350). Alternatively, the user can select to discard any changes and close the local copy (block 370). The user can also select to cancel the close operation (block 360) and continue to edit the local copy. The user can also choose to select one of the check-in options shown in blocks 320 or 330. The closing of the file may not in itself release the lock for the user. However, the lock can be released if the user selects the check-in options shown in blocks 320 or 330, and described below in FIG. 4.

Figure 4:
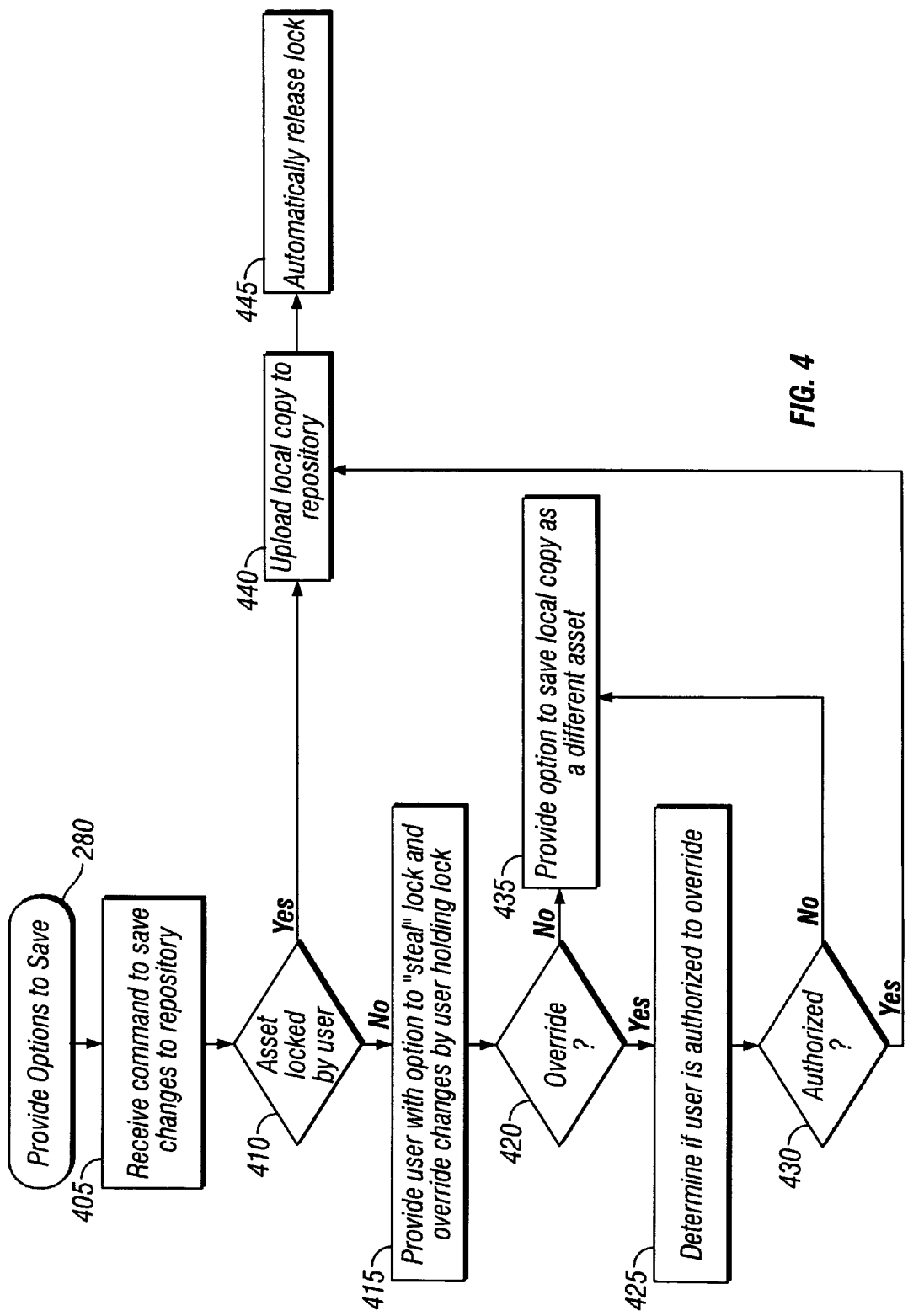
FIG. 4 is a flowchart illustrating a process for saving an asset.

FIG. 4 shows a flowchart for checking in a version of the asset. When the user editing the local copy of the asset selects to save the changes back to the repository, the program receives a command to save the changes to the repository (block 405), and the local copy of the asset is first saved on the client machine.

The monitoring system can use the status information to determine if the changes made to the local copy of the asset are in conflict with changes made by another user, and issue appropriate guidance. The monitoring system can also use the status information to check if the local copy is a recent version of the asset when compared to the asset version in the repository. If the asset in the repository is a newer version than the local copy (block 215), the user is alerted that there is a newer version available on the repository, and the user is presented with the option to download the latest version of the asset (block 230) as shown in FIG. 2. So, the local copy may not be saved on the repository in some cases when the local copy is not the recent version.

If the user currently has the lock when checking in their local copy of the asset (block 410), the local copy can be uploaded to the repository (block 440), and the lock will be automatically released for the user in the registry (block 445). When the lock for the user is released, the user is unregistered from the registry as a user of the asset. When uploading the local copy to the repository (block 440), the program can also prompt the user to enter descriptive comments regarding the changes made to the asset. When sharing the local copy with other users during the check-in, the user can share the descriptive comments, such as when the changes were done, how the changes fit into the overall project goals, and if other users should be advised of any other additional changes or tasks to perform on the asset.

If the user does not have the lock when checking in their local copy of the asset, the user is presented with an option to override changes made by another user (block 420). If the user selects not to override the changes of another user, the program can permit the user to choose to save the local copy as a different asset (blocks 435, 330). When the user is saving the different asset, the monitor does not need to determine if a conflict exists because there are currently no other users working on the new asset.

If the user selects to override the changes of the other user (block 420), the program will determine if the user has the authorization to override the changes of the other user (block 425). For example, the user may not have the authorization to override the other user's changes if the user has a minor role in a group's project for an asset. If the user does not have the authorization to override the changes of the other user (block 430) then the user can be presented with an option to save the local copy of the asset in the repository as a different asset (block 435). The program can abort the save operation if the user does not have the authorization and does not select to save the local copy as a different asset. However, if the user does have the authorization to override the changes of the other user (block 430), the local copy can be uploaded to the repository (block 440), and the lock can be automatically released for the user in the registry (block 445).

As shown in FIGS. 1-4, the asset in the repository can have a state, and each local copy of the asset can have a state. When a user edits an asset, the user can change the state of their local copy. When a user checks in an asset (e.g., FIG. 3, block 320), the user can change the state of the original asset in the repository.

Conflicts can be detected between the states of the local copies and the state of the asset. For example, assume that two users (users 1 and 2) have identical local copies of an asset (i.e., each local copy has the same state, such as state A). If user 2 starts making changes, the state of his local copy will change to state B, and a conflict occurs (i.e., user 1 has state A, and user 2 has state B, which is different from state A because of the changes made by user 2). In this case, user 1 is notified of the conflict, and given guidance about how to resolve the conflict (i.e., user 1 can resolve the conflict in states by closing their local copy, or user 1 can ignore the conflict in states and deal with the consequences later).

FIG. 5 shows an exemplary table 500 of some of the guidance that is provided to the user. The columns in the table 500 show a type of conflict 510 that can occur, the alert 540 that can be issued, and the guidance 570 that can presented to the user when the conflict occurs. In one example of guidance that is provided for a conflict, an "in use" alert (cell 545) is issued when a user has opened a local copy of the asset, and another user begins to edit the asset (cell 515). The user is presented with the option (cell 570) to close the asset or to continue using the local copy of the asset. In another example of guidance that is shown in FIG. 5, a conflict (cell 520) occurs when a user has opened a local copy of the asset, and a newer version of the asset is saved to the repository before the user has begun to edit the local copy of the asset. An "out of date" alert (cell 550) is issued, and the user is provided with the option (cell 580) to download the new version of the asset or to continue using the local copy of the asset.

A conflict (cell 525) can also occur when the user has begun to edit the local copy of the asst, and a newer version of the asset is saved to the repository. For this conflict (cell 525), a "server update" alert (cell 555) is issued, and the user is presented with the option (cell 585) to download the new version of the asset and discard changes made by the user or to continue editing the local copy of the asset and resolve the difference at a later time. In another example, a conflict (cell 530) occurs when a user begins editing the local copy of the asset while another user is already editing the asset. For this conflict (cell 530), an "edit" alert (cell 560) is issued and the user is presented with the option (cell 590) to discard the changes made by the user, or to continue to edit the local copy of the asset and resolve the difference at a later time. In another guidance example, a conflict (cell 535) occurs when a user attempts to save the changes made to the asset in the repository while another user is editing the asset. A "conflict" alert (cell 565) is issued, and the user is presented with the option (cell 595) to cancel the save to the repository or to save the changes to the asset to the repository and ask the other user to discard their changes.

Figure 6:
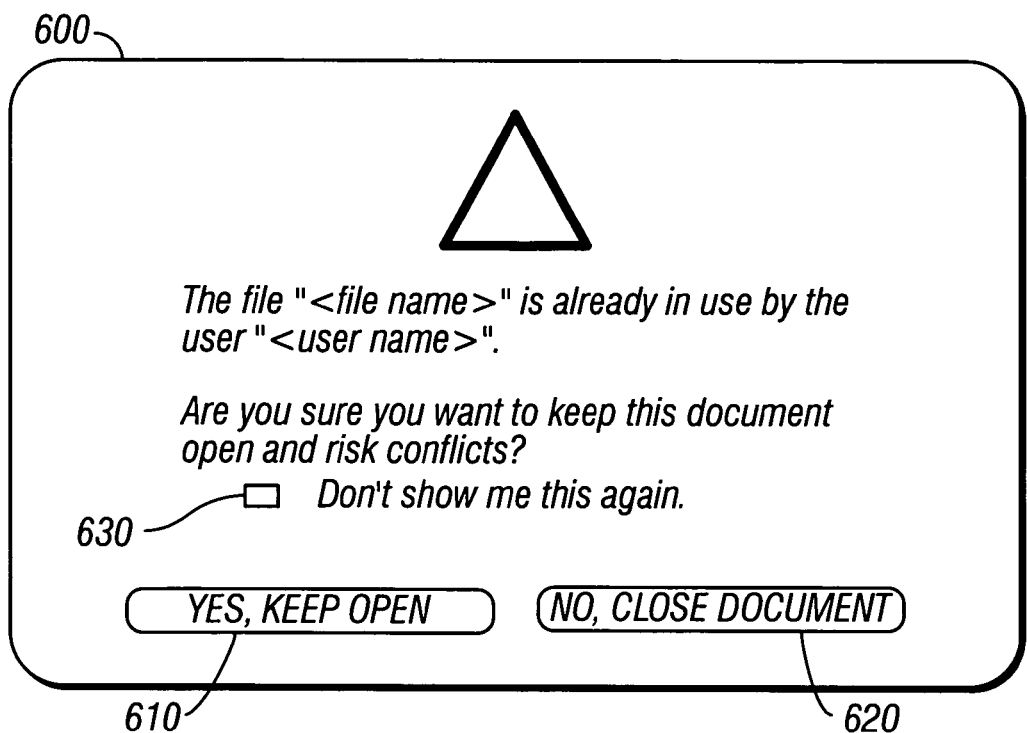
FIG. 6 illustrates guidance in a graphical user interface (GUI).

FIG. 6 shows an example of guidance that is provided to the user in a graphical user interface (GUI), such as a dialog box or a pop-up window, and/or some graphical representation, such as a link to another window. The monitoring system provides continuous monitoring about the users that are actually working on the asset and provides guidance to users using one or more graphical user interfaces. The guidance can be in the form of warnings and alerts, as well as in providing options for the user when issuing those warnings and alerts. FIG. 6 illustrates an example of guidance 600 that is provided when the monitoring system detects that another user has begun to edit the asset before the user begins to edit the asset (blocks 220, 235 in FIG. 2). The user is presented with the option to keep the local copy of the asset open (block 610) or to close the local copy of the asset (block 620).

The asset management system can provide guidance that can be obtrusive or non-obtrusive guidance. The user can be required to acknowledge obtrusive guidance, but may be allowed to ignore non-obtrusive guidance. For example, non-obtrusive guidance can refer to a display of a graphical alert icon when another user has updated the asset, and obtrusive guidance can refer to a display of a graphical selection list that requires the user to choose from one or more options when saving the local copy of an asset (FIG. 3, block 280). The user can be provided with guidance when there are conflicting or potential conflicting states, as well as in cases where conflicting or potential conflicting states do not occur. In one implementation, the guidance can provide the user with obtrusive help when conflicts or potential conflicts occur, and can provide the user with non-obtrusive help when there are no conflicts or potential conflicts. In another implementation, the user can be provided with less obtrusion when performing basic actions, but more obtrusion when the user is required to make a decision, such as being required to make a selection to save during the closing of a local copy. The guidance, obtrusive or non-obtrusive, and the monitoring can allow the user to perform check-in and check-out of an asset with improved efficiency and a reduced number of steps. In another instance, the user can be provided an option to not receive or continue to receive guidance or certain types of guidance. The user can select to discontinue receiving the guidance, including alerts and warnings (FIG. 6, 630).

As used in this specification, the terms "document" and "asset" can mean a set of electronic data, including both electronic data stored in a file and electronic data received over a network. An electronic document or form could, but does not necessarily correspond to a file. A document or form can be stored in a portion of a file that holds other documents or forms, in a single file dedicated to the document or form in question, or in a set of coordinated files. An asset can refer to an individually identifiable and accessible holder of content, and can be a standalone entity of content. An asset can be shared among multiple users and provided with a common namespace in a repository. Each asset can be given a unique name or identifier, and the common namespace in the repository can make the asset uniquely identifiable for the multiple, shared users of the asset. The asset can be "nested" or "compounded," in which a document can include the content and/or context of related documents, and the document can be affected by the changes of other users on one or more related documents. The guidance can be provided to the user based on the status of the nested asset.

Because a local copy of an asset can refer to a copy of the asset that is in a storage location other than the storage location of the repository, each local copy of the asset can correspond to a distinct storage location. The system can monitor the storage location of each local copy, and which user has the lock of the asset. The copies of the asset management system are not limited to local copies on a client machine. Although most users typically may not share their local storage location with other users, different users can share a distinct storage location. In one implementation, the asset management system can resemble a hierarchical asset management system.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The systems and techniques described here can be implemented in a computing system that includes a back end component (e.g., as a data server), or that includes a middleware component (e.g., an application server), or that includes a front end component (e.g., a client computer having a graphical user interface, portal, or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), a wireless local area network (WLAN), a personal area network (PAN), a mobile communication network using a multiple access technology (e.g., a cellular phone network with code division multiple access, CDMA), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. As one example, the process depicted in FIG. 2 does not require the particular order shown, or sequential order, to achieve desirable results (e.g., when the user has a local copy of the asset, another user can place a newer version of the asset in the repository at any time). Also, the described techniques can be performed with or without the described monitoring, with or without the versioned repository, and/or with or without compound documents. The collaborative asset management techniques can also be employed in areas other than business goals and professional workflows. Other embodiments are within the scope of the following claims.

What is claimed is:

1. A computer program product, stored on a machine-readable medium, the computer program product comprising instructions to perform operations comprising:
proving a first copy of an original asset for use by a first user, the original asset being available for use and editing by multiple users, the original asset and the first copy each having a corresponding state;
monitoring changes in the state of the original asset, in the state of the first copy, and in one or more additional states corresponding to one or more additional copies of the original asset, the additional copies of the original asset corresponding to one or more concurrent users from the multiple users, the changes being caused by actions of the first user and the concurrent users;
if a conflict is detected between the state of the first copy and the state of the original asset, or between the state of the first copy and the states of the additional copies, providing guidance to the first user about how to resolve the conflict;
detecting when the first user has made one or more changes to the first copy of the original asset; and
upon detecting that the first user has made one or more changes to the first copy of the original asset, automatically attempting to lock the original asset on behalf of the first user,
wherein detecting the conflict comprises determining whether the original asset is already locked on behalf of one of the multiple users, and
wherein the instructions providing guidance comprises providing the first user with an option to disregard the changes made to the first copy of the original asset.

2. The computer program product of claim 1, wherein the first copy of the original asset is obtained from a repository.

3. The computer program product of claim 2, wherein the repository is a remote repository.

4. The computer program product of claim 2, wherein the repository comprises multiple distinct storage locations.

5. The computer program product of claim 4, wherein the multiple distinct storage locations are arranged in a peer-to-peer configuration.

6. The computer program product of claim 1, wherein monitoring changes comprises communicating with a registry, the registry being operable to store a status of one or more of the additional copies of the original asset, each copy of the original asset corresponding to a distinct storage location.

7. The computer program product of claim 1, wherein:
the original asset is stored in a repository;
detecting the conflict comprises determining whether the original asset stored in the repository is newer than the first copy of the original asset; and
the instructions providing guidance comprises providing the first user with an option to replace the first copy of the original asset with the original asset in the repository.

8. The computer program product of claim 1, wherein:
the instructions providing guidance are provided in a graphical user interface.

9. The computer program product of claim 1, wherein:
detecting the conflict comprises determining whether one of the concurrent users is editing one or more of the additional copies of the original asset; and
the instructions providing guidance comprises providing the first user with an option to close the first copy of the original asset.

10. The computer program product of claim 1, wherein the computer program product further comprises instructions to perform operations comprising:
when the conflict cannot be detected, warning the first user that the computer program product cannot provide assurance of detecting conflicting states for the original asset.

11. The computer program product of claim 10, wherein the computer program product further comprises instructions to perform operations comprising:
when the conflict can once again be detected after not being able to be detected, determining whether there are changes to the first copy of the original asset; and
upon determining there are changes to the first copy of the original asset, providing the first user with an option to discard the changes to the first copy of the original asset.

12. The computer program product of claim 1, wherein metadata is associated with the original asset, the metadata having a state, and wherein detecting the conflict comprises detecting a conflict in the state of the metadata.

13. A computer program product, stored on a machine-readable medium, the computer program product comprising instructions to perform operations comprising:
providing a first copy of an original asset for use by a first user, the original asset being available for use and editing by multiple users, the original asset and the first copy each having a corresponding state;
monitoring changes in the state of the original asset, in the state of the first copy, and in one or more additional states corresponding to one or more additional copies of the original asset, the additional copies of the original asset corresponding to one or more concurrent users from the multiple users, the changes being caused by actions of the first user and the concurrent users;
if a conflict is detected between the state of the first copy and the state of the original asset, or between the state of the first copy and the states of the additional copies, providing guidance to the first user about how to resolve the conflict;
receiving one or more changes made to the first copy of the original asset by the first user;
receiving user input from the first user, the user input indicating that the first copy of the original asset should be saved to a repository, wherein the original asset is stored in the repository;
determining if the original asset is locked on behalf of the first user;
if the original asset is locked on behalf of the first user:
saving the first copy of the original asset in the repository; and
automatically unlocking the original asset,
wherein detecting the conflict comprises determining whether the original asset is already locked on behalf of one of the multiple users, and
wherein the providing guidance comprises:
notifying the first user that one of the multiple users had made conflicting changes to the original asset; and
providing the first user with an option to save the first copy of the original asset in the repository; and if the original asset is locked on behalf of one of the multiple users and the first user indicates to save the first copy of the original asset in the repository, the computer program product further comprises instructions to perform operations comprising:
  attempting to unlock the original asset; and
  if the attempt to unlock the original asset is successful, saving the first copy of the original asset in the repository.

14. The computer program product of claim 13, wherein the computer program product further comprises instructions to perform operations comprising:
  receiving another user input from the first user, the another user input comprising a selection to close the original asset;
  determining if the changes have been saved to the first copy of the original asset;
  if the changes have not been saved to the first copy of the original asset, providing the first user with an option to save the changes to the first copy of the original asset or to the original asset; and
  if the changes have been saved to the first copy of the original asset, providing the first user with an option to save the changes to the original asset stored in the repository.

15. A method comprising:
  providing a first copy of an original asset for use by a first user, the original asset being available for use and editing by multiple users, the original asset and the first copy each having a corresponding state;
  monitoring changes in the state of the original asset, in the state of the first copy, and in one or more additional states corresponding to one or more additional copies of the original asset, the additional copies of the original asset corresponding to one or more concurrent users from the multiple users, the changes being caused by actions of the first user and the concurrent users;
  if a conflict is detected between the state of the first copy and the state of the original asset, or between the state of the first copy and the states of the additional copies, providing guidance to the first user about how to resolve the conflict, wherein the guidance is provided in a graphical user interface;
  detecting when the first user has made one or more changes to the first copy of the original asset; and
  upon detecting that the first user has made one or more changes to the first copy of the original asset, automatically attempting to lock the original asset on behalf of the first user,
  wherein detecting the conflict comprises determining whether the original asset is already locked on behalf of one of the multiple users, and
  wherein providing guidance comprises providing the first user with an option to disregard the changes made to the first copy of the original asset.

16. A method comprising:
  providing a first copy of an original asset for use by a first user, the original asset being available for use and editing by multiple users, the original asset and the first copy each having a corresponding state;
  monitoring changes in the state of the original asset, in the state of the first copy, and in one or more additional states corresponding to one or more additional copies of the original asset, the additional copies of the original asset corresponding to one or more concurrent users from the multiple users, the changes being caused by actions of the first user and the concurrent users;
  if a conflict is detected between the state of the first copy and the state of the original asset, or between the state of the first copy and the states of the additional copies, providing guidance to the first user about how to resolve the conflict, wherein the guidance is provided in a graphical user interface;
  receiving one or more changes made to the first copy of the original asset by the first user;
  receiving user input from the first user, the user input indicating that the first copy of the original asset should be saved to a repository, and wherein the original asset is stored in the repository;
  determining if the original asset is locked on behalf of the first user; and
  if the original asset is locked on behalf of the first user:
    saving the first copy of the original asset in the repository; and
    automatically unlocking the original asset; and
  wherein detecting the conflict comprises determining whether the original asset is already locked on behalf of one of the multiple users, and
  wherein the providing guidance comprises:
    notifying the first user that one of the multiple users had made conflicting changes to the original asset; and
    providing the first user with an option to save the first copy of the original asset in the repository; and
  if the original asset is locked on behalf of one of the multiple users and the first user indicates to save the first copy of the original asset in the repository, the method further comprises:
    attempting to unlock the original asset; and
    if the attempt to unlock the original asset is successful, saving the first copy of the original asset in the repository.

17. An asset management system comprising:
  an original asset, wherein the original asset is available for use and editing by multiple users;
  a repository configured to store the original asset;
  a first copy of the original asset for use by a first user, the original asset and the first copy each having a corresponding state;
  a first storage unit for the first copy of the original asset; and
  a processor to monitor changes in the state of the original asset, in the state of the first copy, and in one or more additional states corresponding to one or more additional copies of the original asset, the additional copies of the original asset corresponding to one or more concurrent users from the multiple users, the changes being caused by actions of the first user and the concurrent users,
  wherein if a conflict is detected between the state of the first copy and the state of the original asset, or between the state of the first copy and the states of the additional copies, the processor is configured to provide guidance to the first user about how to resolve the conflict, wherein the guidance is provided in a graphical user interface,
  wherein the processor is configured to detect when the first user has made one or more changes to the first copy of the original asset,
  wherein upon detecting that the first user has made one or more changes to the first copy of the original asset, the processor is configured to automatically attempt to lock the original asset on behalf of the first user,
  wherein detecting the conflict comprises a determination of whether the original asset is already locked on behalf of one of the multiple users, and wherein the guidance comprises an option for the first user to disregard the changes made to the first copy of the original asset.

18. An asset management system comprising:

an original asset, wherein the original asset is available for use and editing by multiple users;

a repository configured to store the original asset;

a first copy of the original asset for use by a first user, the original asset and the first copy each having a corresponding state;

a first storage unit for the first copy of the original asset; and a processor to monitor changes in the state of the original asset, in the state of the first copy, and in one or more additional states corresponding to one or more additional copies of the original asset, the additional copies of the original asset corresponding to one or more concurrent users from the multiple users, the changes being caused by actions of the first user and the concurrent users, wherein if a conflict is detected between the state of the first copy and the state of the original asset, or between the state of the first copy and the states of the additional copies, the processor is configured to provide guidance to the first user about how to resolve the conflict, wherein the guidance is provided in a graphical user interface, wherein the system is configured for receiving one or more changes made to the first copy of the original asset by the first user, wherein the system is configured for receiving user input from the first user, the user input indicating that the first copy of the original asset should be saved to a repository, and wherein the original asset is stored in the repository, wherein the processor is configured for determining if the original asset is locked on behalf of the first user, and if the original asset is locked on behalf of the first user, the processor is configured to execute operations for:
saving the first copy of the original asset in the repository, and
automatically unlocking the original asset; and wherein when detecting the conflict the processor is configured to determine whether the original asset is already locked on behalf of one of the multiple users, and wherein when providing guidance the processor is configured to perform operations comprising:
notifying the first user that one of the multiple users had made conflicting changes to the original asset; and
providing the first user with an option in the graphical user interface to save the first copy of the original asset in the repository; and if the original asset is locked on behalf of one of the multiple users and the first user indicates to save the first copy of the original asset in the repository, the processor is configured for operations comprising:
attempting to unlock the original asset; and
if the attempt to unlock the original asset is successful, saving the first copy of the original asset in the repository.

* * * * *

UNITED STATES PATENT AND TRADEMARK OFFICE
CERTIFICATE OF CORRECTION

| | | |
|---|---|---|
| PATENT NO. | : 7,603,357 B1 | Page 1 of 1 |
| APPLICATION NO. | : 10/858857 | |
| DATED | : October 13, 2009 | |
| INVENTOR(S) | : Gourdol et al. | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by (1181) days Delete the phrase "by 1181 days" and insert -- by 1511 days --

Signed and Sealed this

Twenty-seventh Day of April, 2010

David J. Kappos
*Director of the United States Patent and Trademark Office*